UNITED STATES PATENT OFFICE.

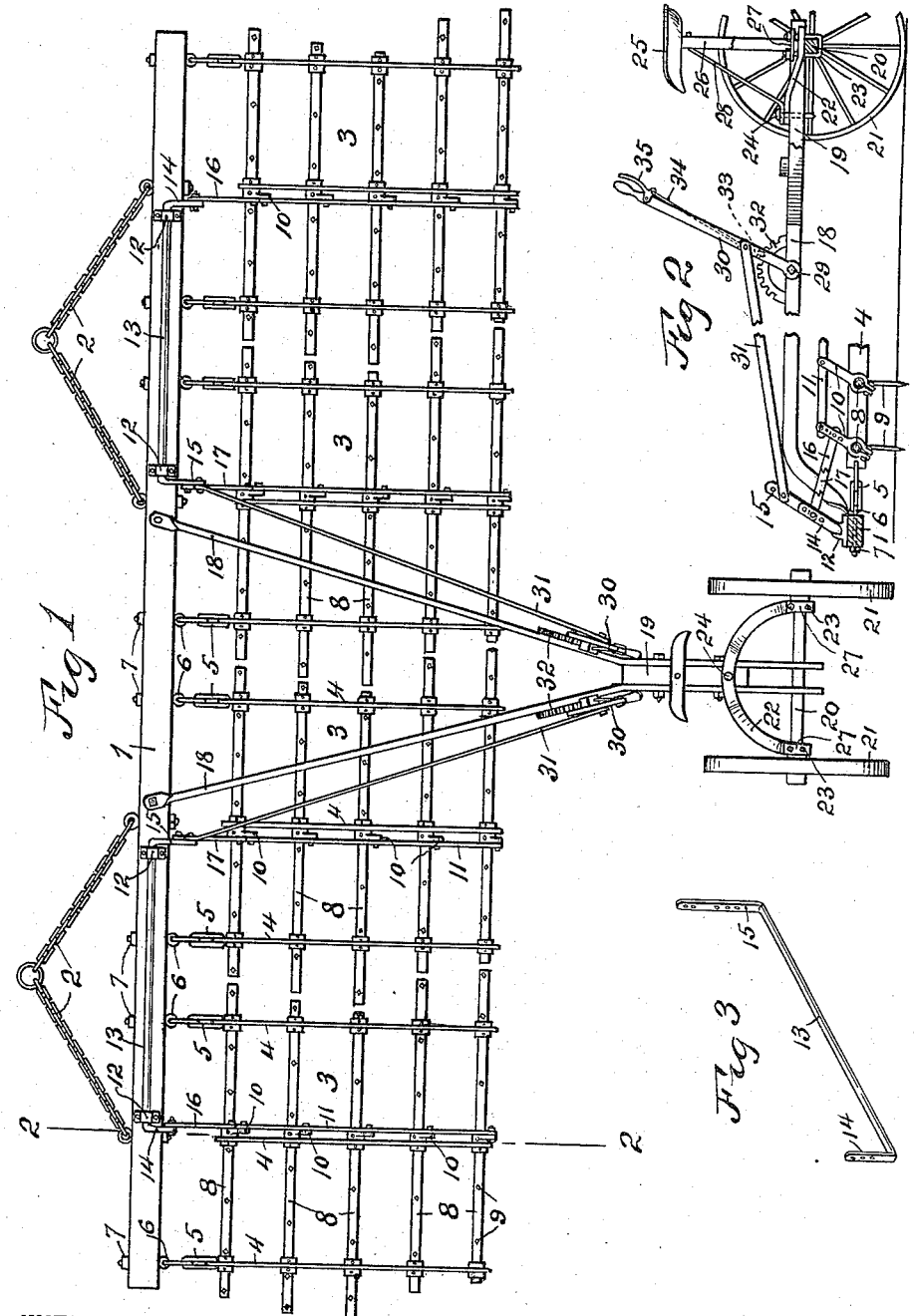

LEWIS E. HANSEN, OF KANSAS CITY, MISSOURI.

HARROW.

1,177,183.  Specification of Letters Patent.  Patented Mar. 28, 1916.

Application filed March 18, 1915. Serial No. 15,251.

*To all whom it may concern:*

Be it known that I, LEWIS E. HANSEN, a citizen of the United States, residing at Kansas City, in the county of Jackson and State of Missouri, have invented a certain new and useful Improvement in Harrows, of which the following is a specification.

My invention relates to improvements in harrows.

It relates to harrows of the type having pivoted tooth bars adapted to be adjusted to different angles.

The object of my invention is to provide a harrow which is simple in construction, which is durable and not liable to get out of order, which is efficient in operation, and which may be easily and quickly adjusted to different operative positions while in use.

A further object of my invention is to provide a harrow of the sulky type and which is adapted to have a plurality of harrow sections, and which can be easily and quickly operated in changing the positions of the toothed bars by an operator occupying the sulky seat.

The novel features of my invention are hereinafter fully described and claimed.

In the accompanying drawing which illustrates the preferred embodiment of my invention, Figure 1 is a plan view of my improved harrow with the seat and some of the parts removed. Fig. 2 is a cross section, partly broken away, on the plane of the line 2—2 of Fig. 1. Fig. 3 is a perspective view of one of the rock shafts which is mounted on the draft bar.

Similar reference characters designate similar parts in the different views.

1 designates the horizontal draft bar to which are secured ordinary draft chains 2. At the rear of the draft bar 1 are a plurality of harrow sections 3, each consisting of a frame comprising a plurality of bars 4 disposed horizontally transversely to the draft bar 1. Each harrow section is flexibly connected to the draft bar 1 by chains 5, the rear ends of which are respectively connected to the outer bars 4, and the forward ends of which are respectively connected to eye bolts 6 which extend, preferably, through the middle of the draft bar 1, and which have respectively mounted on their forward ends nuts 7, which bear against the forward side of the draft bar 1. Each harrow section is provided with a plurality of tooth bars 8, to which are secured harrow teeth 9, and which are pivotally mounted in holes provided in the bars 4, the tooth bars being disposed parallel with the bar 1.

Respectively secured to the tooth bars 8 are crank arms 10, Fig. 2, said crank arms of each harrow section being pivoted to a connecting bar 11. In the form of my invention shown in the drawing, four harrow sections 3 are shown. Pivoted in bearings 12, preferably secured on top of the draft bar 1 are two rock shafts 13, each disposed in front of two harrow sections, and each provided with two cranks 14 and 15. Each crank 14 is pivoted to the forward end of a link 16, the rear end of which is pivoted to the forward crank arm 10 of the adjacent harrow section, Fig. 2. Each crank 15 is pivoted to the forward end of a link 17, the rear end of which is pivoted to the forward crank arm 10 of the adjacent harrow section. When the rock shafts 13 are rocked, the tooth bars 8 will be swung to different positions, so as to have the teeth 9 disposed at different angles to the surface of the ground. The mechanism for rocking the rock shafts will be hereinafter described.

Attached to the draft bar 1 is a wheeled sulky frame consistsing preferably of the following described parts: Two rearwardly extending tongues 18 have their forward ends diverging and secured to the draft bar 1. The rear parallel portions of the tongue 18 are bolted or otherwise secured respectively to opposite sides of a bar 19 and extend over and rest upon an axle 20, upon which are rotatably mounted carrying wheels 21. A forwardly extending horizontal arcuate yoke 22 has its rear ends secured by U-bolts 23 to the axle 20, and at its middle portion rests upon the tongues 18 and bar 19, and is pivoted to the latter by a vertical king bolt 24. A seat 25 is mounted upon an inverted V-shaped support 26, the lower ends of which are clamped to the top of the axle 20 by horizontal plates 27 secured to the axle by the U-bolts 23, Fig. 2. An oblique downwardly and forwardly extending brace 28, Fig. 2, has its upper end secured to the upper part of the support 26, and its lower end is secured to the yoke 22 by the king bolt 24. Pivoted respectively to the outer sides of the tongues 18 by horizontal bolts 29, Fig. 2, are two levers 30, to which are respectively pivoted the rear ends of two connecting rods 31, the forward ends of which are respectively pivoted to the arms 15. Secured respectively to the tongues 18 concentrically with the bolts 29, are two arcuate peripherally toothed plates 32, which are respectively adapted to be releasably locked to the levers 30 by the usual sliding bolts 33 respectively connected by rods 34 to two bell crank levers 35, which are of the usual type and which are respectively pivoted in the usual manner to the levers 30.

By swinging the levers 30, the operator occupying the seat 25 through the mechanism already described, consisting of the rods 31, rock shafts 13, links 16 and 17, connecting bars 11 and crank arms 10, can adjust the tooth bars 8 to any desired operative position. The levers 30 will be releasably held in the positions to which they are adjusted by the bolts 33 engaging with the toothed plates 32.

I do not limit my invention to the structure herein shown and described, as modifications, within the scope of the appended claims, may be made without departing from the spirit of my invention.

What I claim is:—

1. A harrow comprising a draft bar, a harrow section comprising a frame, tooth bars pivotally mounted in said frame, each bar being provided with a crank arm, and a connecting bar pivoted to said crank arms, flexible draft means connecting said frame with said draft bar, a rock shaft pivoted to said draft bar and provided with a crank, a link pivoted to said crank and to one of said crank arms, and means for rocking said rock shaft.

2. A harrow comprising a draft bar, a harrow section comprising a frame, tooth bars pivotally mounted in said frame, each bar having a crank arm, and a connecting bar pivoted to said crank arms, flexible draft means connecting said frame with said draft bar, a rock shaft pivoted to said draft bar and provided with a crank, a link pivoted to said crank and to one of said crank arms, a wheeled frame connected to and drawn by said draft bar, a lever pivoted to said wheeled frame, and a connecting rod pivoted to said lever and to said crank.

3. A harrow comprising a draft bar, a harrow section comprising a frame consisting of a plurality of bars, tooth bars pivotally mounted in said bars, each tooth bar having a crank arm, and a connecting bar pivoted to said crank arms, flexible draft means connecting said frame with said draft bar, a rock shaft pivoted to said draft bar and having a crank, a link pivoted to said crank and to one of said crank arms, a lever, and connecting means between said lever and said crank for rocking said shaft.

4. A harrow comprising a draft bar, two harrow sections, each comprising a plurality of bars, tooth bars pivotally mounted in said bars, each tooth bar having a crank arm, and a connecting bar pivoted to said crank arms, flexible draft means connecting said harrow sections with said draft bar, a rock shaft pivoted to said draft bar and having two cranks, two links pivoted at one set of ends respectively to said cranks, and pivoted at the other set of ends respectively to two of the crank arms of said two sections, and means for rocking said rock shaft.

5. A harrow comprising a draft bar, two harrow sections, each comprising a plurality of bars, tooth bars pivotally mounted in said bars, each tooth bar having a crank arm, and a connecting bar pivoted to said crank arms, flexible draft means connecting said harrow sections with said draft bar, a rock shaft pivoted to said draft bar and having two cranks, two links pivoted at one set of ends respectively to said cranks, and pivoted at the other set of ends respectively to two of the crank arms of said two sections, a lever, and means connecting said lever and one of said cranks for rocking said rock shaft.

6. A harrow comprising a draft bar, two harrow sections, each comprising a plurality of bars, tooth bars pivotally mounted in said bars, each tooth bar having a crank arm, and a connecting bar pivoted to said crank arms, flexible draft means connecting said harrow sections with said draft bar, a rock shaft pivoted to said draft bar and having two cranks, two links pivoted at one set of ends respectively to said cranks, and pivoted at the other set of ends respectively to two of the crank arms of said two sections, a wheeled frame connected to and drawn by said draft bar, a lever pivoted to said wheeled frame, and means connecting said lever and one of said cranks for rocking said rock shaft.

7. A harrow comprising a draft bar, a harrow section provided with a frame, tooth bars pivotally mounted in said frame, flexible draft means connecting said frame with said draft bar, a rock member oscillatable on said draft bar, means actuated by said rock member for simultaneously rocking said tooth bars, and means for rocking said rock member.

8. A harrow comprising a draft bar, a harrow section provided with a frame, tooth bars pivotally mounted in said frame, draft means connecting said frame with said draft bar, a rock member pivoted to said draft bar, means actuated by said rock member for simultaneously rocking said tooth bars, and means for rocking said rock member.

In testimony whereof I have signed my name to this specification in presence of two subscribing witnesses.

LEWIS E. HANSEN.

Witnesses:
WARREN D. HOUSE,
R. E. HAMILTON.

Copies of this patent may be obtained for five cents each, by addressing the "Commissioner of Patents, Washington, D. C."